(12) United States Patent
Teather (10) Patent No.: US 9,747,130 B2
(45) Date of Patent: Aug. 29, 2017

(54) MANAGING NODES IN A HIGH-PERFORMANCE COMPUTING SYSTEM USING A NODE REGISTRAR

(71) Applicant: Microsoft Technology Licensing, LLC, Redmond, WA (US)

(72) Inventor: Gregory Wray Teather, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/741,807

(22) Filed: Jun. 17, 2015

(65) Prior Publication Data

US 2016/0004563 A1    Jan. 7, 2016

Related U.S. Application Data

(63) Continuation of application No. 13/162,130, filed on Jun. 16, 2011, now abandoned.

(51) Int. Cl.
  *G06F 9/48* (2006.01)
  *G06F 9/46* (2006.01)
  *H04L 29/08* (2006.01)
  *G06F 9/50* (2006.01)

(52) U.S. Cl.
  CPC .......... *G06F 9/4843* (2013.01); *G06F 9/5061* (2013.01); *G06F 9/465* (2013.01); *G06F 9/4881* (2013.01); *G06F 9/5011* (2013.01); *G06F 2209/505* (2013.01); *H04L 29/08144* (2013.01)

(58) Field of Classification Search
  None
  See application file for complete search history.

(56) References Cited

U.S. PATENT DOCUMENTS

| | | | |
|---|---|---|---|
| 5,666,486 A | 9/1997 | Alfieri et al. | |
| 5,793,962 A | 8/1998 | Badovinatz et al. | |
| 5,964,837 A * | 10/1999 | Chao | H04L 41/22 709/224 |
| 6,385,643 B1 * | 5/2002 | Jacobs | G06F 9/465 709/201 |
| 6,578,068 B1 | 6/2003 | Bowman-Amuah | |
| 6,691,244 B1 | 2/2004 | Kampe et al. | |
| 6,928,589 B1 | 8/2005 | Pomaranski et al. | |
| 7,185,075 B1 | 2/2007 | Mishra et al. | |
| 7,185,076 B1 | 2/2007 | Novaes et al. | |

(Continued)

OTHER PUBLICATIONS

Fang et al., "Designing High-Performance Computing Clusters", Reprinted from Dell Power Solutions, May 2005, 4 pgs., Retrieved at dell.com/downloads/global/power/ps2q05-20040181-Fang-OE.pdf>>.

(Continued)

*Primary Examiner* — Abu Ghaffari (57) ABSTRACT

A method of managing nodes in a high-performance computing (HPC) system, which includes a management subsystem and a job scheduler subsystem, includes providing a node registrar subsystem. Logical node management functions are performed with the node registrar subsystem. Other management functions are performed with the management subsystem using the node registrar subsystem. Job scheduling functions are performed with the job scheduler subsystem using the node registrar subsystem.

20 Claims, 6 Drawing Sheets

(56) References Cited

U.S. PATENT DOCUMENTS

| | | | |
|---|---|---|---|
| 7,188,343 B2 | 3/2007 | Sanchez, II et al. | |
| 7,266,822 B1 | 9/2007 | Boudnik et al. | |
| 7,366,989 B2 | 4/2008 | Naik et al. | |
| 7,415,003 B1* | 8/2008 | Ogura | H04L 41/044 370/229 |
| 7,433,931 B2 | 10/2008 | Richoux | |
| 7,711,977 B2 | 5/2010 | Ballew et al. | |
| 7,861,246 B2* | 12/2010 | Lu | G06F 9/5072 709/201 |
| 8,008,722 B2* | 8/2011 | Kim | H01L 27/11548 257/347 |
| 8,336,040 B2 | 12/2012 | Davidson et al. | |
| 8,433,801 B1* | 4/2013 | Yemini | G06Q 10/06 709/226 |
| 8,453,152 B2* | 5/2013 | Druyan | G06F 9/5038 712/28 |
| 8,724,463 B2 | 5/2014 | Agarwal et al. | |
| 8,914,805 B2* | 12/2014 | Krishnamurthy | G06F 9/4881 718/105 |
| 2001/0009014 A1* | 7/2001 | Savage, III | H04L 29/06027 709/204 |
| 2005/0172088 A1* | 8/2005 | Klingman | G06F 9/4843 711/154 |
| 2005/0235055 A1 | 10/2005 | Davidson | |
| 2005/0251567 A1 | 11/2005 | Ballew et al. | |
| 2006/0064486 A1 | 3/2006 | Baron et al. | |
| 2006/0198386 A1* | 9/2006 | Liu | H04L 67/32 370/419 |
| 2007/0094662 A1* | 4/2007 | Berstis | G06F 9/505 718/102 |
| 2007/0124731 A1* | 5/2007 | Neiman | G06F 9/4843 718/100 |
| 2008/0307426 A1 | 12/2008 | Toeroe | |
| 2008/0320482 A1* | 12/2008 | Dawson | G06F 9/5027 718/104 |
| 2009/0254552 A1* | 10/2009 | Vinberg | G06F 17/30 |
| 2009/0254917 A1 | 10/2009 | Ohtani | |
| 2009/0276482 A1 | 11/2009 | Rae et al. | |
| 2010/0005160 A1* | 1/2010 | Sparks | H04L 41/12 709/222 |
| 2010/0185823 A1 | 7/2010 | De et al. | |
| 2010/0281166 A1* | 11/2010 | Buyya | G06F 9/5072 709/226 |
| 2011/0119381 A1* | 5/2011 | Glover | G06F 9/5072 709/226 |
| 2011/0125894 A1 | 5/2011 | Anderson et al. | |
| 2011/0138051 A1* | 6/2011 | Dawson | G06F 9/5072 709/226 |
| 2011/0145383 A1 | 6/2011 | Bishop et al. | |
| 2011/0296423 A1* | 12/2011 | Elnozahy | G06F 9/54 718/102 |
| 2012/0042256 A1 | 2/2012 | Jamjoom et al. | |
| 2012/0124584 A1* | 5/2012 | Addala | G06F 9/542 718/102 |

OTHER PUBLICATIONS

Ahmed, et al., "The Cluster as Server: An Integrated Approach to Managing HPC Clusters", Retrieved at <<jp.dell.com/app/4q02-Ahm.pdf>>, Nov. 2002, pp. 37-41.

* cited by examiner

MANAGING NODES IN A HIGH-PERFORMANCE COMPUTING SYSTEM USING A NODE REGISTRAR

CROSS-REFERENCE TO RELATED APPLICATIONS

This application is a continuation of U.S. application Ser. No. 13/162,130, filed Jun. 16, 2011, the specification of which is incorporated by reference herein.

BACKGROUND

High-performance computing (HPC) or cluster computing is increasingly used for a large number of computationally intense tasks, such as webscale data mining, machine learning, network traffic analysis, and various engineering and scientific tasks. In such systems, jobs may be scheduled to execute concurrently on a computing cluster in which application data is stored on multiple compute nodes.

Previous implementations of HPC clusters have maintained multiple node databases, between management and scheduler subsystems (with one-to-one mapping between the node-entries in each subsystem). This can lead to several problems, including the following: (1) Interaction between subsystems is informal and fragile; (2) scalability of a cluster is limited to the least scalable subsystem (for example, a system management subsystem may struggle if there are more than 1000 nodes); and (3) different types of HPC nodes may require different types of management and scheduling solutions.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A node registrar subsystem is disclosed that, according to one embodiment, is implemented as a service and a database, and acts as a central repository for information about all nodes within an HPC system. The node registrar subsystem formalizes data sharing between the HPC subsystems, and allows interaction with heterogeneous subsystems: different types of management, job scheduler, and monitoring solutions. The node registrar subsystem also facilitates scale-out of both management infrastructure and the job scheduler by delegating responsibility of different nodes to different sub-system instances.

One embodiment is directed to a method of managing nodes in a high-performance computing (HPC) system, which includes a management subsystem and a job scheduler subsystem. The method includes providing a node registrar subsystem. Logical node management functions are performed with the node registrar subsystem. Other management functions are performed with the management subsystem using the node registrar subsystem. Job scheduling functions are performed with the job scheduler subsystem using the node registrar subsystem.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

The following detailed description is directed to technologies for implementing a node registrar as a central repository for information about all nodes in a high-performance computing (HPC) system. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
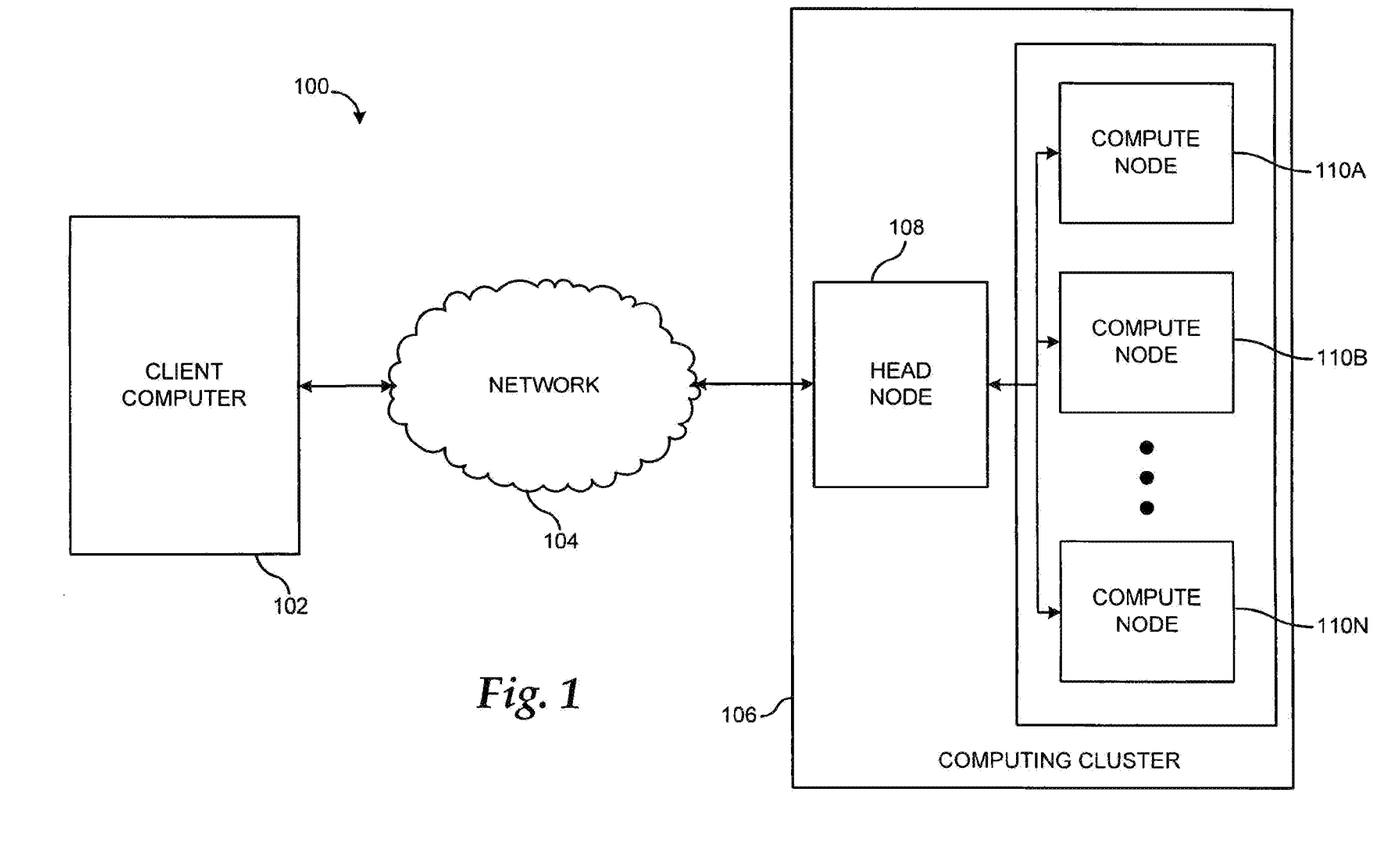
FIG. 1 is a block diagram illustrating a high-performance computing (HPC) system suitable for implementing embodiments described herein.

FIG. 1 is a block diagram illustrating an HPC system suitable for implementing embodiments described herein. The system 100 includes a client computer 102 capable of connecting to a HPC system through a network 104. The client computer 102 comprises, for example, a desktop, laptop, or mobile computing system. The system 100 also includes an HPC system, such as the computing cluster 106. An HPC system according to one embodiment is any type of computing system that offers computational performance at least an order of magnitude greater than a desktop computing system. For instance, HPC systems may include, but are not limited to, computing clusters, such as the computing cluster 106, mainframe computing systems, supercomputers, or other types of high performance grid computing systems.

In the embodiments presented herein, the HPC system utilized by the client computer 102 comprises the computing cluster 106. The computing cluster 106 includes a head node 108 and one or more compute nodes 110A-110N (collectively referred to as nodes or compute nodes 110). The head node 108 comprises a computing system responsible for performing tasks such as job management, cluster management, scheduling of tasks, and resource management for all of the compute nodes 110A-110N in the computing cluster 106. The compute nodes 110A-110N are computing systems that perform the actual computations. The computing cluster 106 may have virtually any number of compute nodes 110A-110N. A node or a compute node according to one embodiment is an individually identifiable computer within an HPC system.

It should be appreciated that the network 104 may comprise any type of local area network or wide area network suitable for connecting the client computer 102 and the computing cluster 106. For instance, in one embodiment, the network 104 comprises a high-speed local area network suitable for connecting the client computer 102 and the computing cluster 106. In other embodiments, however, the network 104 may comprise a high-speed wide area network, such as the Internet, for connecting the client computer 102 and the computing cluster 106 over a greater geographical area. It should also be appreciated that the computing cluster 106 may also utilize various high-speed interconnects between the head node 108 and each of the compute nodes 110A-110N.

Figure 2:
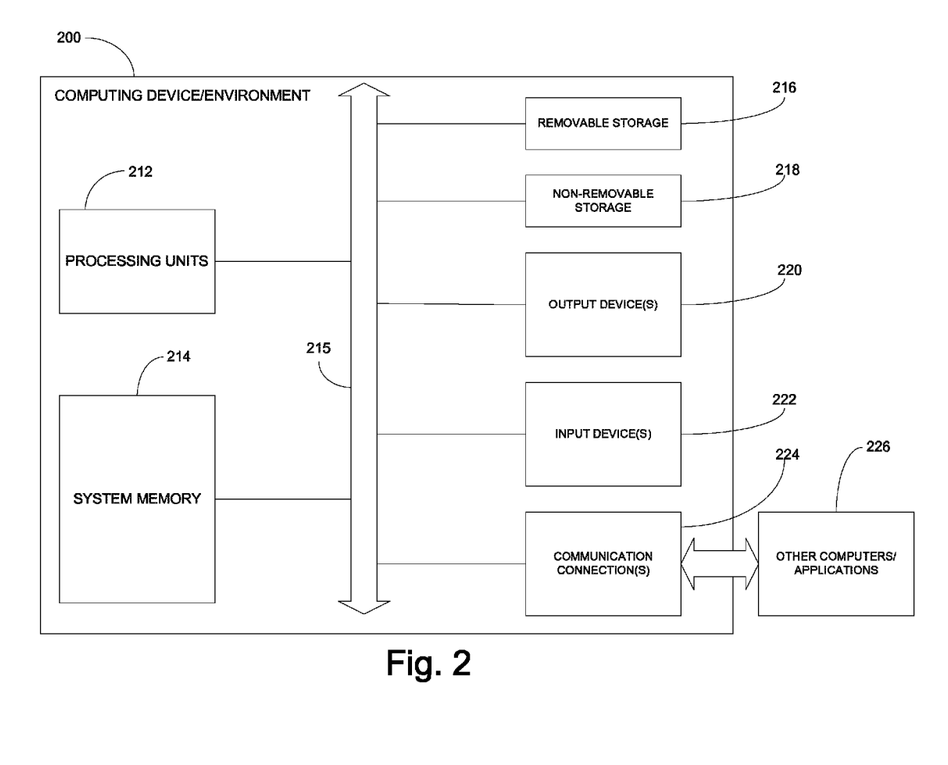
FIG. 2 is a block diagram illustrating a computing device suitable for implementing aspects of the high-performance computing system shown in FIG. 1 according to one embodiment.

FIG. 2 is a block diagram illustrating a computing device 200 suitable for implementing aspects of the high-performance computing system shown in FIG. 1 according to one embodiment. For example, computing device 200 may be used for one or more of client computer 102, head node 108, and compute nodes 110A-110N. In the illustrated embodiment, the computing device 200 includes one or more processing units 212 and system memory 214. Depending on the exact configuration and type of computing device, memory 214 may be volatile (such as RAM), non-volatile (such as ROM, flash memory, etc.), or some combination of the two.

Computing device 200 may also have additional features/ functionality. For example, computing device 200 may also include additional storage (removable and/or non-removable) including, but not limited to, magnetic or optical disks or tape. Such additional storage is illustrated in FIG. 2 by removable storage 216 and non-removable storage 218. Computer storage media includes volatile and nonvolatile, removable and non-removable media implemented in any suitable method or technology for storage of information such as computer readable instructions, data structures, program modules or other data. Memory 214, removable storage 216 and non-removable storage 218 are all examples of computer storage media (e.g., computer-readable storage media storing computer-executable instructions that when executed by at least one processor cause the at least one processor to perform a method). Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 200. Any such computer storage media may be part of computing device 200.

The various elements of computing device 200 are communicatively coupled together via one or more communication links 215. Computing device 200 also includes one or more communication connections 224 that allow computing device 200 to communicate with other computers/applications 226. Computing device 200 may also include input device(s) 222, such as keyboard, pointing device (e.g., mouse), pen, voice input device, touch input device, etc. Computing device 200 may also include output device(s) 220, such as a display, speakers, printer, etc.

FIGS. 1 and 2 and the above discussion are intended to provide a brief general description of a suitable computing environment in which one or more embodiments may be implemented, and is not intended to suggest any limitation as to the scope of use or functionality of the embodiments.

Figure 3:
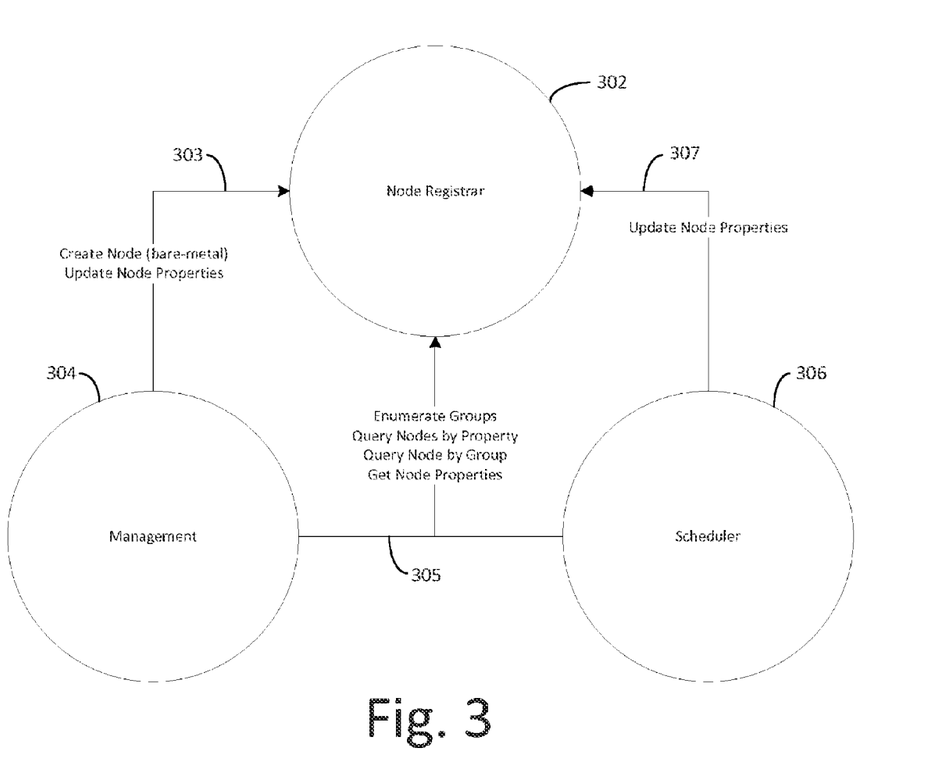
FIG. 3 is a diagram illustrating the interaction between subsystems of the high-performance computing system shown in FIG. 1 according to one embodiment.

FIG. 3 is a diagram illustrating the interaction between subsystems of the HPC system 100 shown in FIG. 1 according to one embodiment. As shown in FIG. 3, HPC system 100 includes a node registrar subsystem 302, a management subsystem 304, and a job scheduler subsystem 306. In one embodiment, subsystems 302, 304, and 306 are implemented on head node 108 (FIG. 1). Management subsystem 304 communicates with node registrar subsystem 302 to create nodes and update node properties as indicated by link 303. Scheduler subsystem 306 communicates with node registrar subsystem 302 to update node properties, as indicated by link 307. Management subsystem 304 and scheduler subsystem 306 further communicate with node registrar subsystem 302 to enumerate groups of nodes, query nodes by property, query nodes by group, and get node properties, as indicated by link 305.

Node registrar subsystem 302 according to one embodiment performs some management functions. In one embodiment, node registrar subsystem 302 performs logical node management (e.g., adding nodes, removing nodes, grouping nodes, and handling state transitions of nodes). Management subsystem 304 according to one embodiment handles: (1) Node deployment (e.g., getting an operating system and HPC Pack running on an actual node); (2) node configuration management (e.g., altering system configuration of a node after initial installation, and then on an ongoing basis); (3) infrastructure configuration management (e.g., altering configuration of network services after cluster setup, and then on an ongoing basis); and (4) node monitoring (e.g., live heat-map and performance charts).

Node registrar subsystem 302 according to one embodiment is implemented as a service and a database, and acts as a central repository for information about all nodes within the HPC system 100 (including, for example, head nodes, compute nodes, broker nodes, workstation nodes, Azure worker nodes, and Azure virtual machine nodes). The node registrar subsystem 302 formalizes data sharing between the HPC subsystems (e.g., between subsystems 302, 304, and 306), and allows interaction with heterogeneous subsystems: different types of management, job scheduler, and monitoring solutions. The node registrar subsystem 302 also facilitates scale-out of both management infrastructure and the job scheduler by delegating responsibility of different nodes to different sub-system instances, and allows different types of management and job scheduler implementations to run side-by-side.

The node registrar subsystem 302 according to one embodiment maintains information that has common relevance across all HPC node types. In one embodiment, this includes node identifiers (such as name and SID), as well as HPC-logical information (such as type, state, and group membership). The node registrar subsystem 302 additionally maintains resource information about the nodes (e.g., information that job scheduler subsystem 306 uses to make scheduling decisions).

Practically, the node registrar subsystem 302 according to one embodiment efficiently drives the node list (both from a graphical user interface (GUI) and Powershell) and acts as an authoritative list of nodes for other components within the HPC system 100. In one embodiment, node registrar subsystem 302 also performs workflows associated with logical changes to the HPC node data, such as adding and removing nodes, updating common node properties, and changing node state.

Additional features and advantages of the node registrar subsystem 302 according to one embodiment include the following: (1) The node registrar interfaces are versioned; (2) treatment of shared data between the HPC management 304 and job scheduler 306 components is streamlined through the node registrar 302; (3) HPC management 304 and job scheduler 306 components are explicitly dependent on the node registrar 302 (and not each other); (4) the node registrar 302 supports nodes running with no management component; (5) the node registrar service is stateless and can scale-out to meet high availability requirements; (6) the node registrar 302 is integrated with a granular permissions system; (7) the node registrar 302 supports multiple authentication modes; (8) the node registrar 302 can run in Azure, using a SQL Azure store; and (9) the node registrar 302 supports client concurrency, executing both read and write operations against the store.

Figure 4:
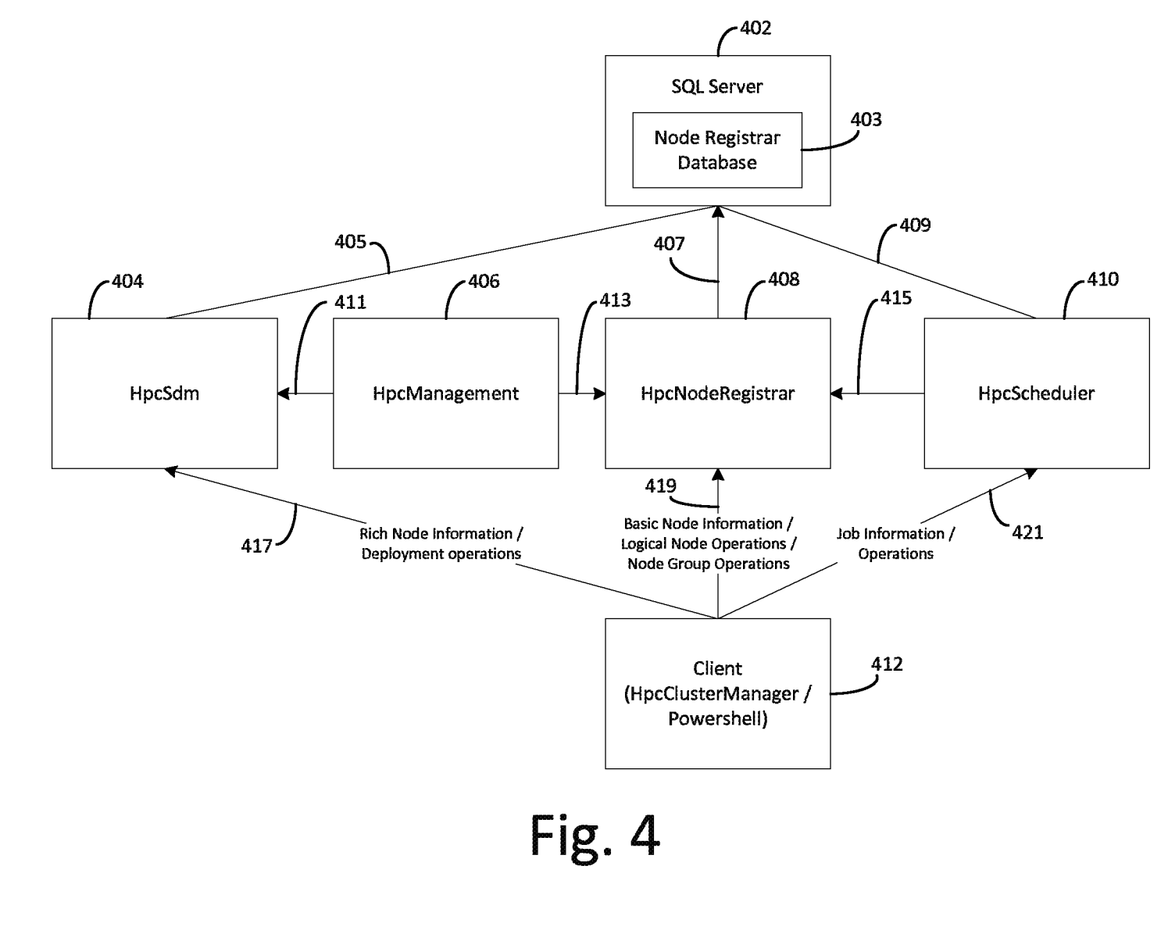
FIG. 4 is a diagram illustrating a process interaction for a head node in the high-performance computing system shown in FIG. 1 according to one embodiment.

FIG. 4 is a diagram illustrating a process interaction for head node 108 in the HPC system 100 shown in FIG. 1 according to one embodiment. HpcSdm service 404 and HpcManagement service 406 correspond to management subsystem 304 (FIG. 3), and provide configuration management of the head node 108 (FIG. 1), as well as manage deployment of compute nodes 110A-110N. HpcNodeRegistrar service 408 corresponds to node registrar subsystem 302 (FIG. 3), and maintains a mapping between nodes and their management and scheduler owners, which facilitates heterogeneous node management solutions, as well as head-node scale-out. HpcScheduler service 410 corresponds to scheduler subsystem 306 (FIG. 3), and schedules jobs to be performed by compute nodes 110A-110N. In one embodiment, there can be more than one HpcScheduler 410 per HpcNodeRegistrar 408, and likewise there can be more than one management component per HpcNodeRegistrar 408. A relational database server 402 (which is a SQL server in the illustrated embodiment) stores a node registrar database 403. The node registrar database 403 also corresponds to the node registrar subsystem 302 shown in FIG. 3.

The node registrar subsystem 302 (FIG. 3) according to one embodiment includes a stateless HpcNodeRegistrar service 408 as well as a database 403 for storing node state information. In one embodiment, an HPC system may include multiple instances of the HpcNodeRegistrar service 408 running on multiple nodes, and all of the instances access the database 403 to manage state information. In one aspect of this embodiment, each head node 108 (FIG. 1) in each cluster of compute nodes 110A-110N of a given HPC system runs a copy of the HpcNodeRegistrar service 408. Clients of the node registrar subsystem 302, such as client computer 102 (FIG. 1), have a list of all of the head nodes 108, and make round-robin connection attempts to the head nodes 108 to access the service 408. In one embodiment, management subsystem 304 and scheduler subsystem 306 (FIG. 3) are also clients of the node registrar subsystem 302. For example, scheduler subsystem 306 may access HpcNodeRegistrar service 408 to determine the state of a particular node and determine based on that state whether to schedule work on that node.

As shown in FIG. 4, services 404, 406, 408, and 410, communicate with each other, as well as with server 402 and client 412, as represented by links 405, 407, 409, 411, 413, 415, 417, 419, and 421. Specifically, client 412 provides rich node information and deployment operations to HpcSdm service 404, as indicated by link 417. Client 412 provides basic node information, logical node operations, and node group operations to HpcNodeRegistrar 408, as indicated by link 419. Client 412 provides job information and operations to HpcScheduler 410, as indicated by link 421.

Figure 5:
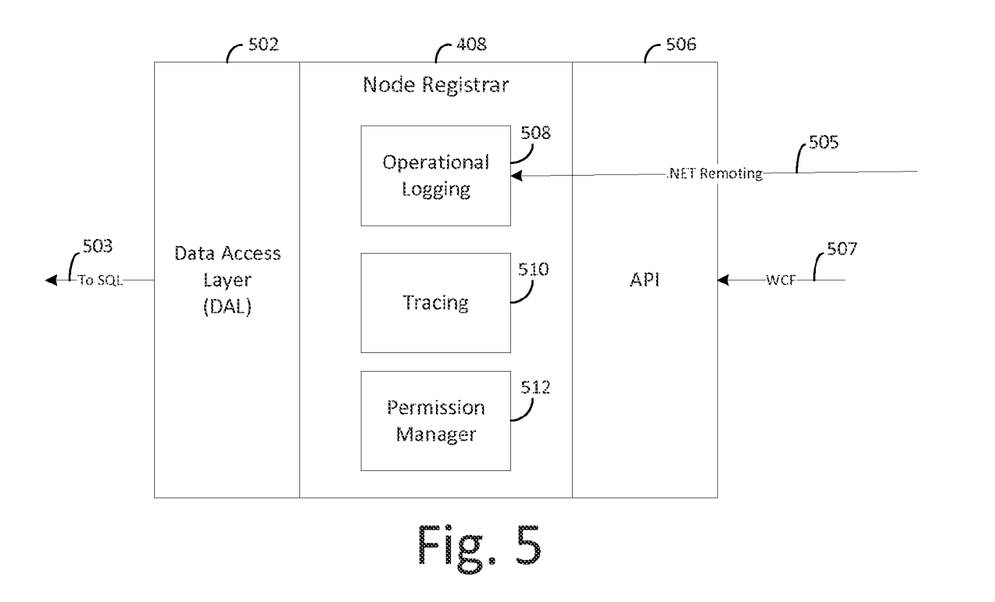
FIG. 5 is a diagram illustrating the internal architecture of a node registrar according to one embodiment.

FIG. 5 is a diagram illustrating the internal architecture of a node registrar service 408 according to one embodiment. Service 408 according to one embodiment is entirely stateless, and handles high-availability through scale-out of multiple services (active-active) rather than relying on failover. Service 408 includes operational logging unit 508, tracing unit 510, and permission manager unit 512. Application programming interface (API) 506 acts as one large monolithic interface presented to all outside components over a single Windows Communication Foundation (WCF) channel 507. In one embodiment, the same interface 506 applies whether the caller is a user interface, arbitrary user code, or an HPC service. In other embodiments, the API 506 can be carved into public and private components as necessary. The API 506 is exposed as a WCF endpoint by each instance of the node registrar service 408, and provides all of the external functionality of the node registrar. The permission manager unit 512 performs authentication and permission-validation for the diverse set of callers. The tracing unit 510 performs eventing and tracing functions (e.g., using an event trace log (ETL)). Operational logging unit 508 logs user operations to the database 403 based on information received through a .NET Remoting link 505. The data access layer (DAL) 502 is a software system component that directly interacts with the server 402, as indicated by link 503.

Multiple instances of the node registrar service 408 can run in active-active configuration against the same database 403 to facilitate high availability. Additionally, each individual node registrar service 408 is running with multiple threads in one embodiment, and there is not any locking in the DAL 502 to prevent simultaneous requests to the database 403.

SQL server 402 stores node registrar database 403, which includes a plurality of tables. The tables in database 403 according to one embodiment include a Node table, a NodeProperty table, a NetworkInterface table, a Service table, a NodeGroup table, a GroupMembership table, and a GlobalSettings table. These tables are described in further detail below.

The Node table is the central table of the node registrar 302. In one embodiment, each row in the Node table corresponds to a node in the HPC installation. Node properties that are columns in this table are first-class properties that may be used in filters. All nodes are versioned in one embodiment, such that if semantic changes are made to a node type and it is desired to exclude it in future versions, the system provides that flexibility.

The NodeProperty table contains arbitrary id/value pairs associated with particular nodes. These values represent second-class node properties. The id column is indexed for reasonably fast lookups. If a node is deleted, the associated properties are cascade deleted.

The NetworkInterface table stores network interface information for nodes. Each node can have a multiple NICs with different MAC addresses.

The Service table contains management and job scheduler components associated with this node registrar. This data serves a few purposes: (1) When a management or scheduler component calls into the node registrar 302, its view of the nodes can be easily scoped to nodes it cares about; (2) the GUI can query the Service table for a list of operation log providers; (3) management and scheduler URIs are associated with each node, allowing the client to find the proper component for data and scenarios that exist outside the node registrar scope.

The NodeGroup table contains a list of HPC Node Groups.

The GroupMembership table provides group membership information for nodes. Each row in this table defines the relationship of a specific node to a specific group. If either the node or node group are deleted, the group membership is cascade deleted.

The GlobalSettings table stores various configuration properties that are common across all active node registrars.

Figure 6:
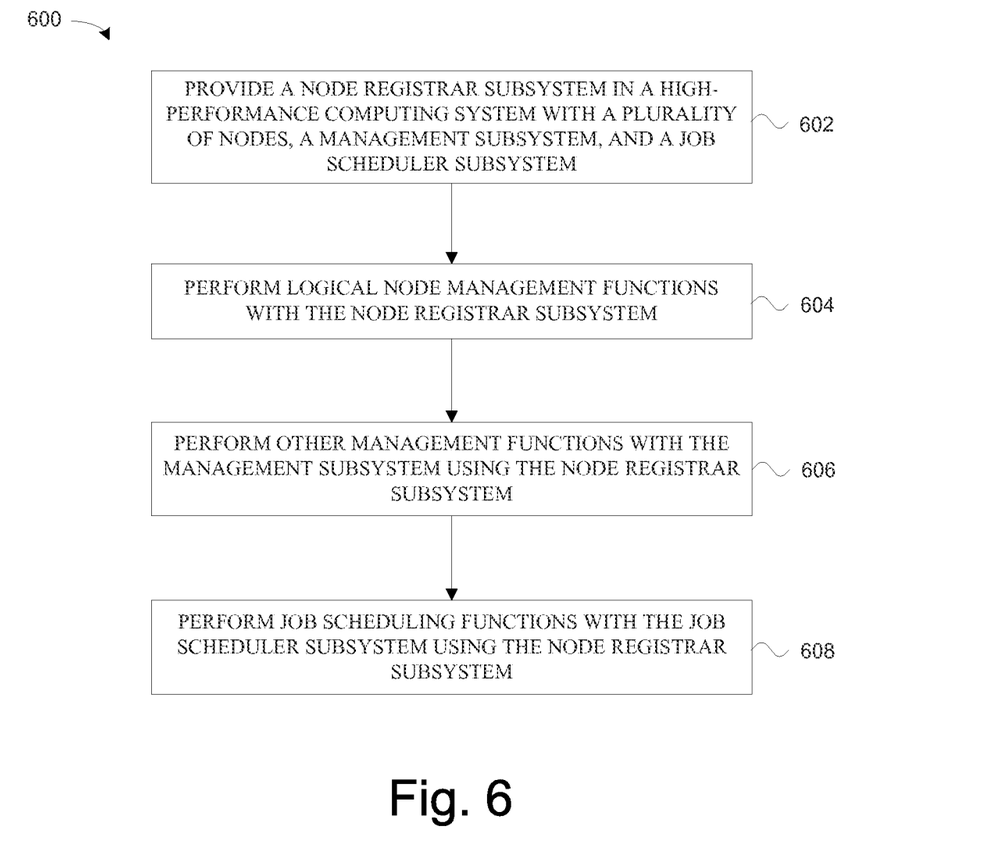
FIG. 6 is a flow diagram illustrating a method of managing nodes in a high-performance computing system according to one embodiment

FIG. 6 is a flow diagram illustrating a method 600 of managing nodes in a high-performance computing (HPC) system 100, which includes a management subsystem 304 and a job scheduler subsystem 306, according to one embodiment. At 602 in method 600, a node registrar subsystem 302 is provided. At 604, logical node management functions are performed with the node registrar subsystem. At 606, other management functions are performed with the management subsystem using the node registrar subsystem. At 608, job scheduling functions are performed with the job scheduler subsystem using the node registrar subsystem.

In one embodiment, the management subsystem 304 and the job scheduler subsystem 306 in method 600 are each a client of the node registrar subsystem 302. The node registrar subsystem 302 in method 600 according to one embodiment comprises a stateless node registrar service 408 and a database 403 for storing node information for the nodes in the HPC system 100. In one embodiment of method 600, the management subsystem 304 is configured to access the stored node information, update node properties in the database 403, and query the nodes by property and by group, using the node registrar service 408. In one embodiment of method 600, the job scheduler subsystem 306 is configured to access the stored node information, update node properties in the database 403, and query the nodes by property and by group, using the node registrar service 408. The database 403 of the node registrar subsystem 302 in method 600 according to one embodiment includes a node table, with each row in the node table corresponding to one of the nodes in the HPC system 100, and each column listing properties of the nodes in the HPC system 100. The logical node management functions performed by the node registrar subsystem 302 in method 600 according to one embodiment include adding nodes, removing nodes, updating node properties, handling state transitions of nodes, and grouping nodes. The other management functions performed with the management subsystem in method 600 according to one embodiment include node deployment, node configuration management, infrastructure configuration management, and node monitoring.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A high-performance computing (HPC) system, comprising:
at least one processor;
a memory communicatively coupled to the at least one processor;
a node registrar subsystem, implemented on the at least one processor, that performs logical node management functions and data sharing between HPC subsystems to provide interaction between heterogeneous subsystems, the logical node management functions including at least one of handling state transitions of nodes, adding the nodes, removing the nodes, and updating node properties, wherein the node registrar subsystem comprises a stateless node registrar service and a database for storing node information for nodes in the HPC system, the stateless node registrar service providing high-availability through scale-out of multiple services rather than relying on failover;
a management subsystem, implemented on the at least one processor, that performs other management functions other than the logical node management functions, wherein the management subsystem communicates with the node registrar subsystem in performing the other management functions; and
a job scheduler subsystem, implemented on the at least one processor, that performs job scheduling functions, wherein the job scheduler subsystem communicates with the node registrar subsystem in performing the job scheduling functions, wherein the management subsystem, the job scheduler subsystem, and the node registrar subsystem are separate, heterogeneous subsystems, and wherein the node registrar subsystem provides communication connections that allow direct communication interaction between the management subsystem, the job scheduler subsystem, and the node registrar subsystem.

2. The HPC system of claim 1, wherein the management subsystem and the job scheduler subsystem access the database using the stateless node registrar service of the node registrar subsystem.

3. The HPC system of claim 1, wherein the management subsystem communicates with the node registrar service to access the stored node information.

4. The HPC system of claim 1, wherein the management subsystem communicates with the stateless node registrar service to update node properties in the database.

5. The HPC system of claim 1, wherein the management subsystem communicates with the stateless node registrar service to query nodes by property.

6. The HPC system of claim 1, wherein the management subsystem communicates with the stateless node registrar service to query nodes by group.

7. The HPC system of claim 1, wherein the job scheduler subsystem communicates with the stateless node registrar service to access the stored node information.

8. The HPC system of claim 1, wherein the job scheduler subsystem communicates with the stateless node registrar service to update node properties.

9. The HPC system of claim 1, wherein the job scheduler subsystem communicates with the stateless node registrar service to query nodes by property.

10. The HPC system of claim 1, wherein the job scheduler subsystem communicates with the stateless node registrar service to query nodes by group.

11. The HPC system of claim 1, wherein the database includes a node table with individual rows in the node table corresponding to individual nodes in the HPC system, and individual columns listing properties of the individual nodes in the HPC system.

12. The HPC system of claim 1, wherein the management subsystem and the job scheduler subsystem are each a client of the node registrar subsystem.

13. The HPC system of claim 1, wherein the other management functions performed by the management subsystem include at least one of node deployment, node configuration management, infrastructure configuration management, or node monitoring.

14. A node registrar subsystem for a high-performance computing (HPC) system, the node registrar subsystem comprising:
   at least one processor;
   a memory communicatively coupled to the at least on processor;
   a database, implemented on the memory, that stores node information for nodes in the HPC system; and
   a stateless node registrar service, implemented on the at least one processor, that performs logical node management functions, communicates with a management subsystem to facilitate access to the database by the management subsystem in response to the management subsystem performing other management functions other than the logical node management functions, and communicates with a job scheduler subsystem to facilitate access to the database by the job scheduler subsystem in response to the job scheduler subsystem performing job scheduling functions, the stateless node registrar service providing high-availability through scale-out of multiple services rather than relying on failover, the logical node management functions including at least one of handling state transitions of the nodes, adding the nodes, removing the nodes, and updating node properties, wherein the management subsystem and the job scheduler subsystem are separate heterogeneous subsystems from the node registrar subsystem, and wherein the node registrar subsystem provides communication connections between the management subsystem, the job scheduler subsystem, and the node registrar subsystem.

15. The node registrar subsystem of claim 14, wherein the other management functions performed by the management subsystem include at least one of node deployment, node configuration management, infrastructure configuration management, or node monitoring.

16. The node registrar subsystem of claim 14, wherein the management subsystem and the job scheduler subsystem access the database of the node registrar subsystem using the stateless node registrar service.

17. The node registrar subsystem of claim 14, wherein the database includes a node table with individual rows in the node table corresponding to individual nodes in the HPC system, and individual columns listing properties of the individual nodes in the HPC system.

18. A method of managing nodes in a high-performance computing (HPC) system, the method comprising:
   performing, by a node registrar subsystem implemented on at least one processor, logical node management functions in the HPC system, the logical node management functions including at least one of handling state transitions of nodes, adding the nodes, removing the nodes, and updating node properties, wherein the node registrar subsystem comprises a stateless node registrar service and a database for storing node information for the nodes in the HPC system, the stateless node registrar service providing high-availability through scale-out of multiple services rather than relying on failover;
   providing, by the node registrar subsystem, communication connections between a management subsystem, a job scheduler subsystem, and the node registrar subsystem, the management subsystem and the job scheduler subsystem being separate heterogeneous subsystems from the node registrar subsystem;
   performing other management functions other than the logical node management functions to be performed within the HPC system with the management subsystem, the management subsystem directly communicating with the node registrar subsystem via the communication connections provided by the node registrar subsystem to perform the other management functions; and
   performing job scheduling functions within the HPC system with the job scheduler subsystem, the job scheduler subsystem directly communicating with the node registrar subsystem via the communication connections to perform the job scheduling functions.

19. The method of claim 18, further comprising:
   providing the management subsystem and the job scheduler subsystem access to the database of the node registrar subsystem using the stateless node registrar service.

20. The method of claim 18, wherein the database includes a node table with individual rows in the node table corresponding to individual nodes in the HPC system, and individual columns listing properties of the individual nodes in the HPC system.

* * * * *